US006987547B2

(12) United States Patent
Yang et al.

(10) Patent No.: US 6,987,547 B2
(45) Date of Patent: Jan. 17, 2006

(54) LIQUID CRYSTAL DISPLAY DEVICE

(75) Inventors: Kie-Hsiung Yang, Taoyuan Hsien (TW); Wei-Chou Chen, Hsinchu (TW)

(73) Assignee: Hannstar Display Corp., Taipei (TW)

( * ) Notice: Subject to any disclaimer, the term of this patent is extended or adjusted under 35 U.S.C. 154(b) by 63 days.

(21) Appl. No.: 10/658,846

(22) Filed: Sep. 9, 2003

(65) Prior Publication Data

US 2004/0109106 A1   Jun. 10, 2004

(30) Foreign Application Priority Data

Dec. 9, 2002   (TW) .............................. 91135537 A (51) Int. Cl.
 *G02F 1/1335*   (2006.01)
(52) U.S. Cl. ......................................... 349/69; 349/61
(58) Field of Classification Search .................. 349/61, 349/69; 313/504
See application file for complete search history.

(56) References Cited

U.S. PATENT DOCUMENTS

| | | | |
|---|---|---|---|
| 5,629,783 A * | 5/1997 | Kanbara et al. .............. 349/70 |
| 5,721,601 A * | 2/1998 | Yamaji et al. .............. 349/138 |
| 5,796,509 A * | 8/1998 | Doany et al. ................ 359/254 |
| 5,926,239 A * | 7/1999 | Kumar et al. .................. 349/69 |
| 6,072,517 A * | 6/2000 | Fork et al. ................... 347/237 |
| 6,100,954 A * | 8/2000 | Kim et al. ................... 349/138 |
| 6,195,196 B1 * | 2/2001 | Kimura et al. .............. 359/295 |
| 6,429,916 B1 * | 8/2002 | Nakata et al. .............. 349/106 |
| 6,441,551 B1 * | 8/2002 | Abe et al. .................... 313/503 |
| 6,556,260 B1 * | 4/2003 | Itou et al. ..................... 349/69 |
| 6,710,541 B2 * | 3/2004 | He et al. ..................... 313/504 |
| 6,781,647 B2 * | 8/2004 | Fujieda ........................ 349/61 |
| 6,788,361 B2 * | 9/2004 | Okada et al. ................. 349/86 |
| 6,870,583 B2 * | 3/2005 | Okada et al. ................. 349/69 |
| 6,900,458 B2 * | 5/2005 | Tung et al. ................... 257/40 |
| 2002/0033908 A1 * | 3/2002 | Mori et al. ................... 349/61 |
| 2002/0085143 A1 * | 7/2002 | Kim et al. .................... 349/61 |
| 2002/0196387 A1 * | 12/2002 | Kimura ....................... 349/61 |
| 2003/0127656 A1 * | 7/2003 | Aizawa et al. ............... 257/79 |
| 2004/0183961 A1 * | 9/2004 | Minoura ..................... 349/61 |
| 2005/0035361 A1 * | 2/2005 | Peterson et al. ............. 257/98 |
| 2005/0062410 A1 * | 3/2005 | Bell et al. ................... 313/506 |

\* cited by examiner

*Primary Examiner*—Kenneth Parker
(74) *Attorney, Agent, or Firm*—Thomas, Kayden, Horstemeyer & Risley (57) ABSTRACT

A liquid crystal display (LCD) device, with an organic electroluminescent display (OLED) element serving as a light source, a common electrode, and a polarizer which is a wire grid polarizer or a thin film polarizer are formed on a lower substrate. A pixel electrode is formed on an upper substrate. According to the invention, a thinner integrated LCD device with improved light utilization efficiency is obtained.

40 Claims, 4 Drawing Sheets

LIQUID CRYSTAL DISPLAY DEVICE

BACKGROUND OF THE INVENTION

1. Field of the Invention

The present invention relates to a liquid crystal display (LCD) device, and more particularly, to an integrated liquid crystal display device having an organic electroluminescent display (OLED) element as a backlight source.

2. Description of the Related Art

A liquid crystal display (LCD) presents images by controlling the orientation of the liquid crystal molecules which in turn control the transmission of light. LCDs are frequently provided with a backlight module to enhance contrast and display visibility.

Conventionally, in most liquid crystal display devices, the backlight module comprises fluorescent tubes arranged in parallel to a light guide plane, with a back reflector to enhance brightness, and a diffuser layer on the light guide plane to provide more uniform illumination to the liquid crystal device. In portable displays, for example, those used in mobile computers, small diameter cold cathode fluorescent tubes are situated at one end or at opposing ends of a light guide panel which directs light toward the liquid crystal device. Conventional backlight modules with fluorescent lamp sources are, however, thicker and limits scaling development.

Additionally, in conventional liquid crystal display devices, polarizers are adhered to the outside surfaces of the liquid crystal display panel and gaps may remain between the polarizers and the liquid crystal display panel. The gaps allow light leakage, decreasing the light utilization efficiency of the liquid crystal display device.

Among currently used liquid crystal display devices, polarizers and a color filter are typically employed. Polarizers, however, only block about 50% of the light during light polarization and drastically reduce the light utilization efficiency of the liquid crystal display device. That is, the light utilization efficiency decreases to 25% when the liquid crystal display device employs two polarizers. Moreover, color filters only block about 66% of the light, thereby further reducing the light utilization efficiency.

Figure 1:
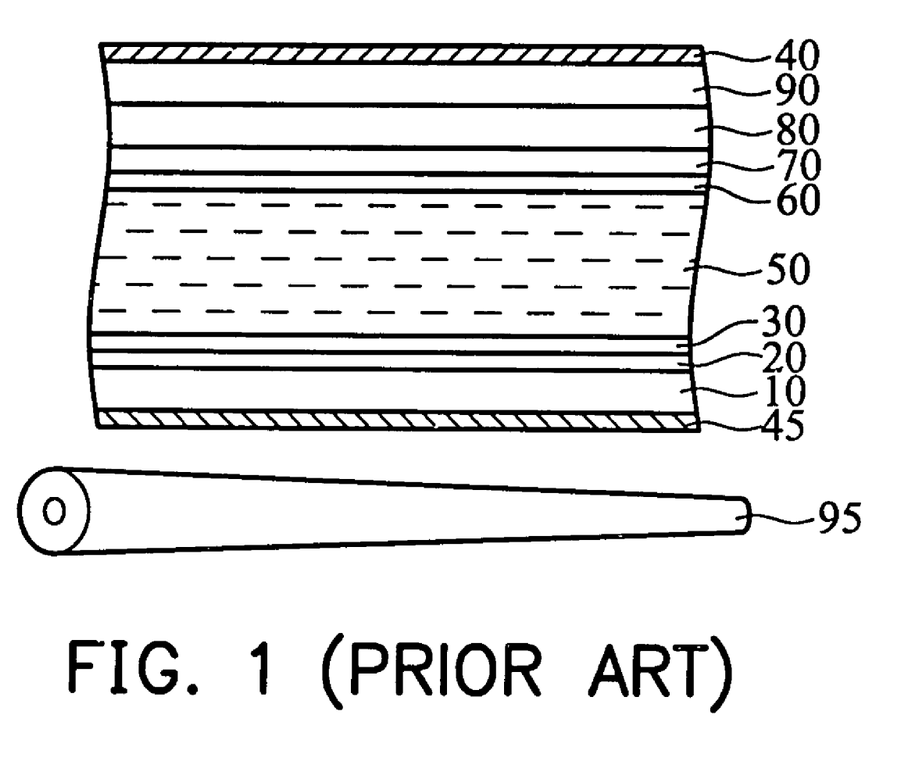
FIG. 1 is a sectional view according to a traditional LCD device.

FIG. 1 is a sectional view of a traditional LCD device. As shown in FIG. 1, the traditional LCD device includes a lower substrate 10, an upper substrate 90, and a liquid crystal layer 50 interposed therebetween. The lower substrate 10 can be a glass substrate comprising a thin film transistor (TFT) array. A pixel electrode 20 is formed on the lower substrate 10. A lower alignment film 30 is formed on the pixel electrode 20. A color filter 80 is formed on the interior surface of the upper substrate 90. A common electrode 70 is formed on the color filter 80. An upper alignment film 60 is formed on the common electrode 70. An upper polarizer 40 is disposed (or adhered) on the exterior surface of the upper substrate 90. A lower polarizer 45 is disposed (or adhered) on the exterior surface of the lower substrate 10. A backlight module 95 is disposed below the lower polarizer 45.

The traditional LCD device has poor light utilization efficiency and scaling limitation problems. Thus, a thinner LCD structure with improved light utilization efficiency is called for.

SUMMARY OF THE INVENTION

The object of the present invention is to provide a liquid crystal display device.

Another object of the present invention is to provide an integrated liquid crystal display device with better light utilization efficiency and thinner thickness.

In order to achieve these objects, the present invention provides a liquid crystal display device. A first substrate is provided. An organic electroluminescent display (OLED) element is formed on the first substrate. A transparent protective layer is formed on the OLED element. A common electrode is formed on the transparent protective layer. A second substrate opposing the first substrate is provided, wherein the second substrate has a pixel electrode thereon. A liquid crystal layer is interposed between the first substrate and the second substrate, wherein the liquid crystal layer is cholesteric liquid crystal.

The present invention also provides another liquid crystal display device. A first substrate is provided. An organic electroluminescent display (OLED) element is formed on the first substrate. A transparent protective layer is formed on the OLED element. A common electrode is formed on the transparent protective layer. A first polarizer is formed on the common electrode, wherein the first polarizer is a wire grid polarizer or a thin film polarizer. A second substrate opposing the first substrate is provided. A pixel electrode is formed on an inner side of the second substrate. A second polarizer is formed on an outer side of the second substrate. A liquid crystal layer is interposed between the first substrate and the second substrate.

The present invention also provides another liquid crystal display-device. A first substrate is provided. An organic electroluminescent display (OLED) element is formed on the first substrate. A transparent protective layer is formed on the OLED element. A first polarizer is formed on the transparent protective layer, wherein the first polarizer is a wire grid polarizer serving as a common electrode. A second substrate opposing the first substrate is provided. A pixel electrode is formed on an inner side of the second substrate. A second polarizer is formed on an outer side of the second substrate. A liquid crystal layer is interposed between the first substrate and the second substrate.

The present invention also provides another liquid crystal display device suitable for an IPS (In-Plane Switching) mode liquid crystal display device. A first substrate is provided. An organic electroluminescent display (OLED) element is formed on the first substrate. A transparent protective layer is formed on the OLED element. A first thin film polarizer is formed on the transparent protective layer. A second substrate opposing the first substrate is provided. An electrode pattern is formed on an inner side of the second substrate, wherein the electrode pattern provides an electric field parallel to the first and second substrates. A second polarizer is formed on an outer side of the second substrate. A liquid crystal layer is interposed between the first substrate and the second substrate.

The present invention improves on the prior art in that the liquid crystal display device is a fully integrated combination of the liquid crystal device and the OLED element serving as a backlight source. The structure invention greatly reduces light leakage caused by gaps, thereby enhancing light utilization efficiency. In addition, the liquid crystal device and the OLED element use the same substrate (the first substrate), thus the weight and thickness of the liquid crystal display device can be decreased. Moreover, since the OLED element of the liquid crystal display device of the invention can be a multi-color display, the present invention does not require color filter(s), thereby enhancing light utilization efficiency and ameliorating the disadvantages of the prior art.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Reference will now be made in detail to the preferred embodiments of the present invention, which are illustrated in the accompanying drawings.

First Embodiment

Figure 2:
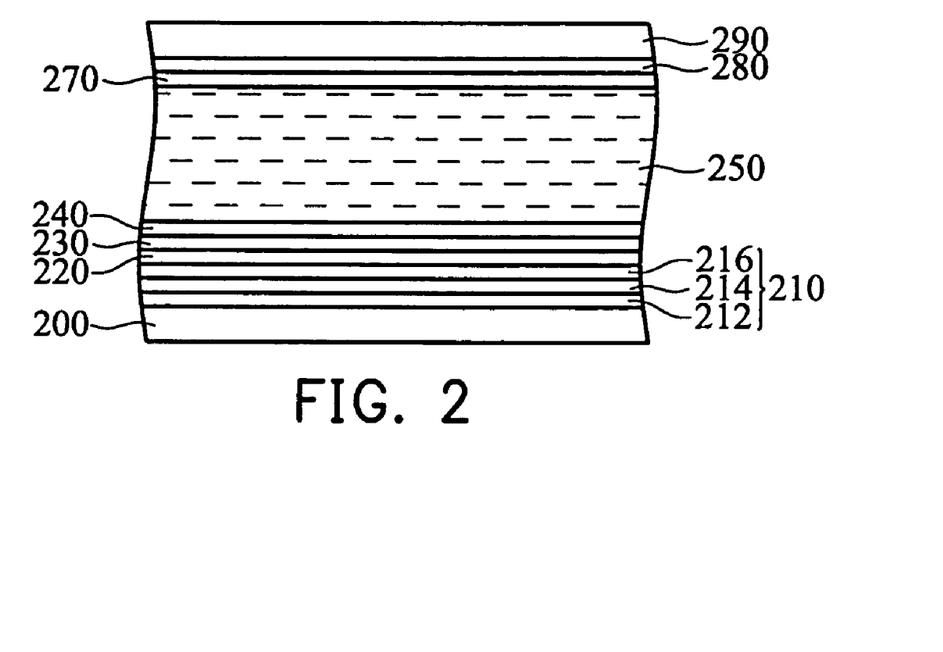
FIG. 2 is a sectional view of an LCD device according to a first embodiment of the present invention.

FIG. 2 is a sectional view of a liquid crystal display device according to a first embodiment of the present invention.

In FIG. 2, a first substrate 200 is provided. The first substrate 200 can be glass or flexible plastic and can be transparent or opaque.

In FIG. 2, an organic electroluminescent display (OLED) element 210 serving as a backlight source is formed on the first substrate 200. A method for forming the OLED element 210 follows, but is not intended to limit the OLED process and the OLED profile of the present invention. For example, a cathode 212 is formed on the first substrate 200. An organic emitter layer 214 is formed on the cathode 212. Then, an anode 216 is formed on the organic emitter layer 214. The cathode 212 is commonly a metal electrode, such as Mg—Ag alloy or Li—Al alloy. The organic emitter layer 214 can comprise doped polymers which can emit different colors of light (e.g. red, green, and blue). The anode 216 is a transparent electrode, such as ITO (indium tin oxide) or IZO (indium zinc oxide). Thus, when a voltage is applied between the cathode 212 and the anode 216, different colors of light are emitted from the organic emitter layer 214 of the OLED element 210. It should be noted that the OLED element 210 can comprise an electron transport layer (not shown), a hole transport layer (not shown) and a hole injection layer (not shown). The detailed process for forming the OLED element 210 is described in U.S. Pat. No. 6,392,339 and other references, and is therefore not discussed herein to avoid obscuring aspects of the present invention.

Since the OLED element 210 absorbs moisture easily, a transparent protective layer 220 is formed over the OLED element 210 to block moisture from diffusing into the OLED element 210. The transparent protective layer 220 can comprise silicon nitride ($SiN_x$), to serve as a moisture blocking layer.

A common electrode 230 is formed on the transparent protective layer 220. The common electrode 230 can comprise ITO (indium tin oxide) or IZO (indium zinc oxide).

A first alignment film 240 (also called orientation film) is formed on the common electrode 230.

A second substrate 290 opposing the first substrate 200 is provided. The second substrate 290 can be glass or flexible plastic. The second substrate 290 can comprise a TFT (thin film transistor) array, and the TFT (not shown) serves as a switching device to control the transmission of the light emitted from the OLED element 210. Then, a pixel electrode 280 is formed on the inner side of the second substrate 290 to electrically connect the TFTs.

A second alignment film 270 is formed on the pixel electrode 280. Then, a liquid crystal material is filled in a space between the first substrate 200 and the second substrate 290 to form a liquid crystal layer 250, thus an LCD device is obtained. It should be noted that the cholesteric liquid crystal material having a light shutter function, such as White-Taylor liquid crystal, is employed in the first embodiment, and the LCD device of the first embodiment does not require polarizers. The cholesteric liquid crystal material is described in U.S. Pat. No. 4,639,090 and other references, and is therefore not discussed herein. In addition, the operating temperature range of the liquid crystal material of the first embodiment is preferably from 40 to 70° C.

According to the LCD device of the first embodiment, the LCD device is a fully integrated structure. The structure of this embodiment greatly reduces light leakage caused by gaps, thereby enhancing light utilization efficiency. Moreover, the liquid crystal device and the OLED element use the same substrate (the first substrate 200), thus device weight and thickness can be reduced. Moreover, since the OLED element in the invention can be a multi-color display, the LCD device of the present invention does not require color filter(s), thereby enhancing light utilization efficiency and ameliorating the disadvantages of the prior art.

Second Embodiment

Figure 3:
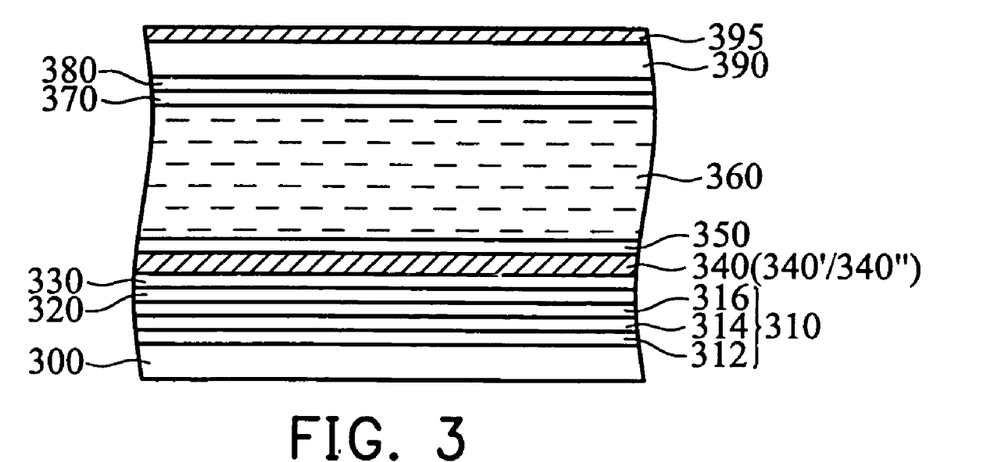
FIG. 3 is a sectional view of an LCD device according to a second embodiment of the present invention.

FIG. 3 is a sectional view of a liquid crystal display device according to a second embodiment of the present invention.

In FIG. 3, a first substrate 300 is provided. The first substrate 300 can be glass or flexible plastic and can be transparent or opaque.

An organic electroluminescent display (OLED) element 310 serving as a backlight source is formed on the first substrate 300. As a method for forming the OLED element 310 follows, but is not intended to limit the OLED process and the OLED profile of the present invention. For example, a cathode 312 is formed on the first substrate 300. An organic emitter layer 314 is formed on the cathode 312. Then, an anode 316 is formed on the organic emitter layer 314. The cathode 312 is commonly a metal electrode, such as Mg—Ag alloy or Li—Al alloy. The organic emitter layer 314 can comprise doped polymers which can emit different colors of light (e.g. red, green, andblue). The anode 316 is a transparent electrode, such as ITO (indium tin oxide) or IZO (indium zinc oxide). Thus, when a voltage is applied between the cathode 312 and the anode 316, different colors of light are emitted from the organic emitter layer 314 of the OLED element 310. It should be noted that the OLED element 310 can comprise an electron transport layer (not shown), a hole transport layer (not shown) and a hole injection layer (not shown). The detailed process for forming the OLED element 210 is described in U.S. Pat. No. 6,392,339 and other references, and is therefore not discussed herein to avoid obscuring aspects of the present invention.

In FIG. 3, since the OLED element 310 absorbs moisture easily, a transparent protective layer 320 is formed on the OLED element 310 to block moisture from diffusing into the OLED element 310. The transparent protective layer 320 can be silicon nitride ($SiN_x$), to serve as a moisture blocking layer.

A common electrode 330 is formed on the transparent protective layer 320. The common electrode 330 can comprise ITO (indium tin oxide) or IZO (indium zinc oxide).

A first polarizer 340 is formed on the common electrode 330, wherein the first polarizer 340 is a wire grid polarizer 340' or a thin film polarizer 340". Since the wire grid polarizer 340' is a reflective polarizer (also called a non-absorbing type polarizer) with excellent thermal resistance, use of the wire grid polarizer 340' as the first polarizer 340 is preferred.

Figure 4A:
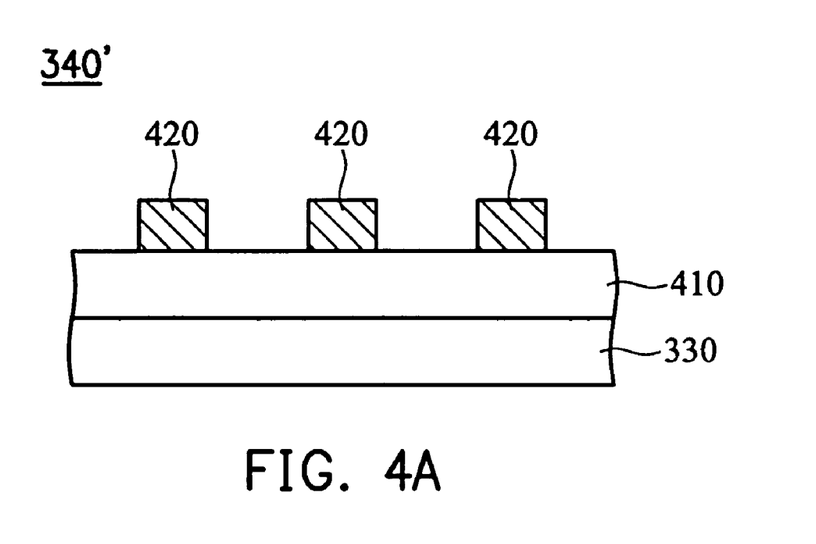
FIG. 4A is a sectional view showing a wire grid polarizer used in the LCD device of the present invention.
Figure 4B:
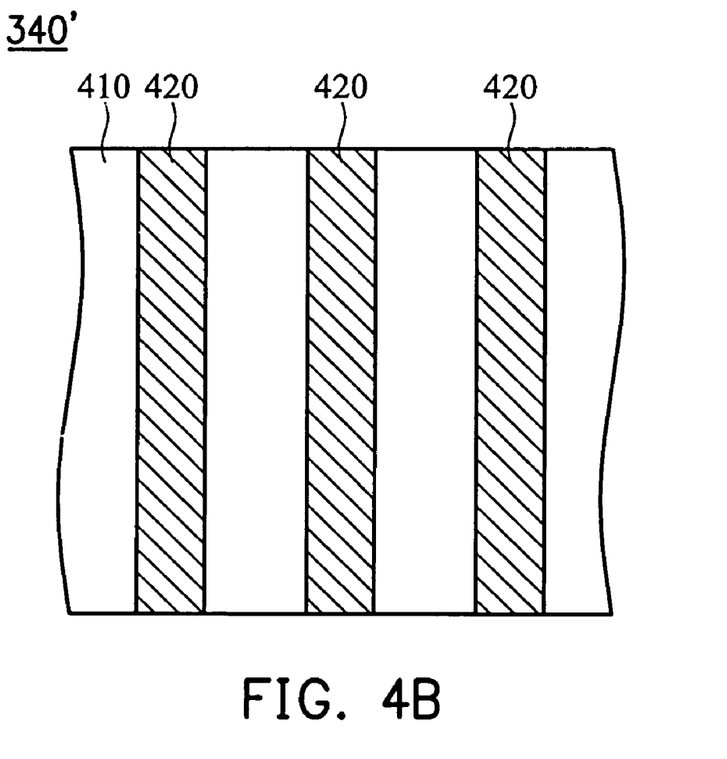
FIG. 4B is a top view showing a wire grid polarizer used in the LCD device of the present invention.

A method for fabricating the wire grid polarizer 340' follows. In FIGS. 4A and 4B, for example, a transparent layer 410, such as a glass layer, is formed on the common electrode 330. Then, a metal strip pattern 420 is formed on the transparent layer 410. The metal strip pattern 420 is an array of parallel, metal strips, such as aluminum ribs, with spaces therebetween.

The method of forming the thin film polarizer 340" follows. For example, a thin crystal film material made by Optiva Company is coated on the common electrode 330. Thus, a thin film E-type polarizer is formed on the common electrode 330.

In FIG. 3, a first alignment film 350 (also called orientation film) is formed on the first polarizer 340.

A second substrate 390 opposing the first substrate 300 is provided. The second substrate 390 can be glass or flexible plastic. The second substrate 390 can comprise a TFT (thin film transistor) array, and the TFT (not shown) serves as a switching device to control the transmission of the light emitted from the OLED element 310. A pixel electrode 380 is then formed on the inner side of the second substrate 390 to electrically connect the TFTs. Finally, a second polarizer 395 is formed on the outer side of the second substrate 390.

A second alignment film 370 is formed on the pixel electrode 380. Liquid crystal material is filled in a space between the first substrate 300 and the second substrate 390 to form a liquid crystal layer 360, thus an LCD device is obtained. It should be noted that the operating temperature range of the liquid crystal material is preferably from 40 to 70° C. In addition, the LCD device of the second embodiment is suitable for use in twisted Nematic (TN) and multi-domain vertical alignment (MVA) LCD devices.

According to the LCD device of the second embodiment, the LCD device is a fully integrated structure. The structure of this embodiment greatly reduces light leakage caused by gaps, thereby enhancing light utilization efficiency. In addition, the liquid crystal device and the OLED element use the same substrate (the first substrate 300), thus device weight and thickness can be reduced. Moreover, since the OLED element in the invention can be a multi-color display, the LCD device of the present invention does not require color filter(s), thereby enhancing light utilization efficiency and ameliorating the disadvantages of the prior art.

Third Embodiment

Figure 5:
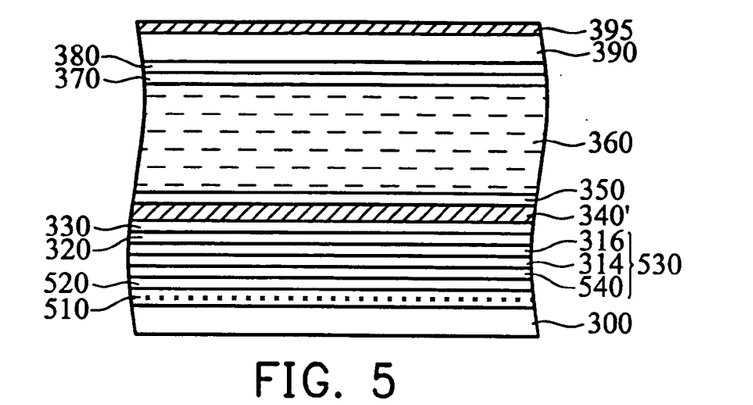
FIG. 5 is a sectional view of an LCD device according to a third embodiment of the present invention.

FIG. 5 is a sectional view of a liquid crystal display device according to a third embodiment of the present invention. Elements in FIG. 5 repeated from FIG. 3 use the same reference numbers. Additionally, because some materials and processes of the parts in the third embodiment are the same as the above, hence, their description is omitted. The difference between the third and second embodiments is that the LCD device of the third embodiment has a retardation film and a reflective layer disposed below the first polarizer (the reflective polarizer), thereby improving light utilization efficiency.

In FIG. 5, a first substrate 300 is provided. A reflective layer 510, such as aluminum, is formed on the first substrate 300. Then, a retardation film 520, such as a ¼λ retardation film, is formed on the reflective layer 510.

An organic electroluminescent display (OLED) element 530 serving as a backlight source is formed on the retardation film 520. The OLED element 530 comprises a cathode 540, an organic emitter layer 314 and an anode 316. It should be noted that the cathode 540 of this embodiment is a semitransparent electrode. The semitransparent cathode 540 can be a thin metal film, such as Au, Ag, Al and others. Typical thickness of the semitransparent cathode 540 is about 50~1000 Å.

A transparent protective layer 320 is formed on the OLED element 530 to block moisture from diffusing into the OLED element 530. The transparent protective layer 320 serves as a moisture blocking layer.

A common electrode 330 is formed on the transparent protective layer 320. The common electrode 330 can comprise ITO (indium tin oxide) or IZO (indium zinc oxide).

A wire grid polarizer 340' is formed on the common electrode 330. The wire grid polarizer 340' is a reflective polarizer (also called non-absorbing type polarizer), and the light reflected from the wire grid polarizer 340' is transformed into light with an optimal vibration direction by means of the reflective layer 510 and the retardation film 520, thus improving light utilization efficiency.

A first alignment film 350 (also called orientation film) is formed on the wire grid polarizer 340'.

In FIG. 5, a second substrate 390 opposing the first substrate 300 is provided. The second substrate 390 can comprise a TFT (thin film transistor) array, and the TFT (not shown) serves as a switching device to control the transmission of the light emitted from the OLED element 530. Then, a pixel electrode 380 is formed on the inner side of the second substrate 390 to electrically connect the TFTs. Finally, an upper polarizer 395 is formed on the outer side of the second substrate 390.

A second alignment film 370 is formed on the pixel electrode 380. Then, a liquid crystal material is filled in a space between the first substrate 300 and the second substrate 390 to form a liquid crystal layer 360, thus an LCD device is obtained. It should be noted that the operating temperature range of the liquid crystal material is preferably from 40 to 70° C. In addition, the LCD device of the third embodiment is suitable for use in twisted Nematic (TN) and multi-domain vertical alignment (MVA) LCD devices.

According to the LCD device of the third embodiment, the LCD device is a fully integrated structure. The structure of this embodiment greatly reduces light leakage caused by gaps, thereby enhancing light utilization efficiency. In addition, the liquid crystal device and the OLED element use the same substrate (the first substrate 300), thus device weight and thickness can be reduced. Since the OLED element in the invention can be a multi-color display, the LCD device of the present invention does not require color filter(s), thereby enhancing light utilization efficiency. Moreover, the reflective layer 510 and the retardation film 520 are disposed below the wire grid polarizer 340', thereby further enhancing light utilization efficiency and ameliorating the disadvantages of the prior art.

Fourth Embodiment

Figure 6:
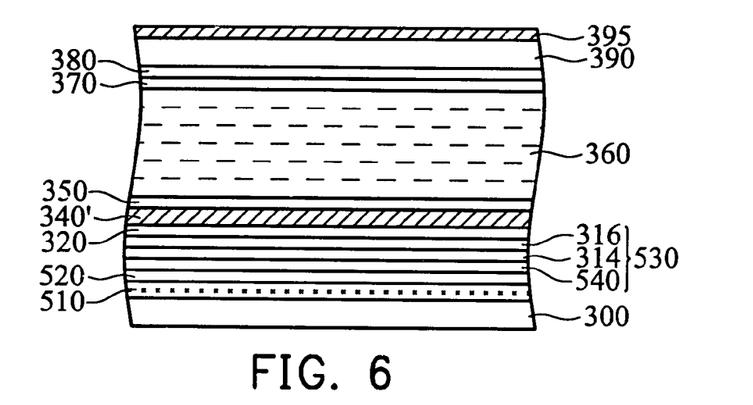
FIG. 6 is a sectional view of an LCD device according to a fourth embodiment of the present invention.

FIG. 6 is a sectional view of a liquid crystal display device according to a fourth embodiment of the present invention. Elements in FIG. 6 repeated from FIG. 5 use the same reference numbers. Additionally, because some materials and processes of the parts in the fourth embodiment are the same as the above, hence, their description is omitted. The difference of the fourth embodiment is that the wire grid polarizer also serves as a common electrode, thereby reducing device thickness and costs.

In FIG. 6, a first substrate 300 is provided. A reflective layer 510, such as aluminum, is formed on the first substrate 300. Then, a retardation film 520, such as a ¼λ retardation film, is formed on the reflective layer 510.

An organic electroluminescent display (OLED) element 530 serving as a backlight source is formed on the retardation film 520. The OLED element 530 includes a cathode 540, an organic emitter layer 314 and an anode 316. It should be noted that the cathode 540 of this embodiment is a semitransparent electrode. Typical thickness of the semitransparent cathode 540 is about 50~1000 Å.

A transparent protective layer 320 is formed on the OLED element 530 to block moisture from diffusing into the OLED element 530. The transparent protective layer 320 serves as a moisture blocking layer.

A wire grid polarizer 340' is formed on transparent protective layer 320. The wire grid polarizer 340' is a reflective polarizer (also called non-absorbing type polarizer), and the light reflected from the wire grid polarizer 340' is transformed into a light with an optimal vibration direction by means of the reflective layer 510 and the retardation film 520, thus improving light utilization efficiency. It should be noted that the wire grid polarizer 340' also serves as a common electrode.

A first alignment film 350 (also called orientation film) is formed on the wire grid polarizer 340'.

In FIG. 6, a second substrate 390 opposing the first substrate 300 is provided. The second substrate 390 can comprise a TFT (thin film transistor) array, and the TFT (not shown) serves as a switching device to control the transmission of the light emitted from the OLED element 530. Then, a pixel electrode 380 is formed on the inner side of the second substrate 390 to electrically connect the TFTs. Then, an upper polarizer 395 is formed on the outer side of the second substrate 390.

A second alignment film 370 is formed on the pixel electrode 380. Liquid crystal material is then filled in a space between the first substrate 300 and the second substrate 390 to form a liquid crystal layer 360, thus an LCD device is obtained. It should be noted that the operating temperature range of the liquid crystal material is preferably from 40 to 70° C. In addition, the LCD device of the fourth embodiment is suitable for use in twisted Nematic (TN) and multi-domain vertical alignment (MVA) LCD devices.

According to the LCD device of the fourth embodiment, the LCD device is a fully integrated structure. The structure of this embodiment greatly reduces light leakage caused by gaps, thereby enhancing light utilization efficiency. In addition, the liquid crystal device and the OLED element use the same substrate (the first substrate 300), thus device weight and thickness can be reduced. Since the OLED element in the invention can be a multi-color display, the LCD device of the present invention does not require color filter(s), thereby enhancing light utilization efficiency. The reflective layer 510 and the retardation film 520 are disposed below the wire grid polarizer 340', thereby further enhancing light utilization efficiency. Moreover, the wire grid polarizer 340' also serves as a common electrode, thereby reducing device thickness and costs, and ameliorating the disadvantages of the prior art.

Fifth Embodiment

Figure 7:
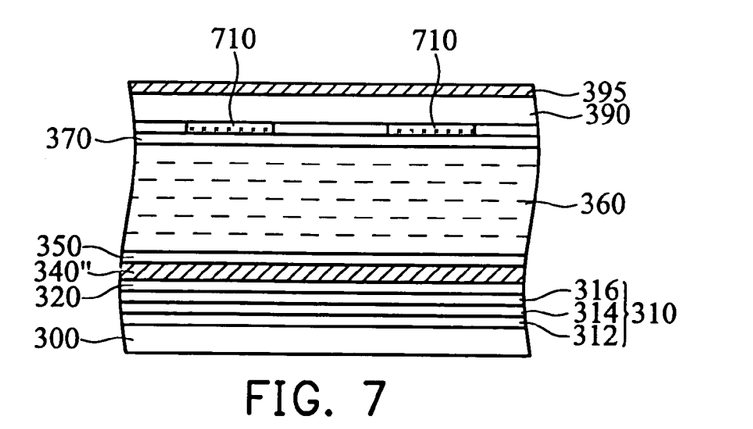
FIG. 7 is a sectional view of an LCD device according to a fifth embodiment of the present invention.

FIG. 7 is a sectional view of a liquid crystal display device according to a fifth embodiment of the present invention. Elements in FIG. 7 repeated from FIG. 3 use the same reference numbers. Additionally, because some materials and processes of the parts in the third embodiment are the same as the above, hence, their description is omitted. Particularly, the LCD device of the fifth embodiment is suitable for use in an IPS (In-Plane Switching) mode LCD device.

In FIG. 7, a first substrate 300 is provided. Then, an organic electroluminescent display (OLED) element 310 serving as a backlight source is formed on the first substrate 300. The OLED element 310 includes a cathode 312, an organic emitter layer 314 and an anode 316.

A transparent protective layer 320 is formed on the OLED element 310 to block moisture from diffusing into the OLED element 310. The transparent protective layer 320 serves as a moisture blocking layer.

A thin film polarizer 340" is formed on the transparent protective layer 320. For example, the thin film polarizer 340" is an E-type polarizer.

A first alignment film 350 (also called orientation film) is formed on the thin film polarizer 340".

In FIG. 7, a second substrate 390 opposing the first substrate 300 is provided. The second substrate 390 can comprise a TFT (thin film transistor) array, and the TFT (not shown) serves as a switching device to control the transmission of the light emitted from the OLED element 310. An electrode pattern 710 is then formed on the inner side of the second substrate 390, wherein the electrode pattern 710 provides an electric field parallel to the first and second substrates 300, 390. Finally, an upper polarizer 395 is formed on the outer side of the second substrate 390.

A second alignment film 370 is formed on the electrode pattern 710. Liquid crystal material is filled in a space between the first substrate 300 and the second substrate 390 to form a liquid crystal layer 360, thus an LCD device is obtained. It should be noted that the operating temperature range of the liquid crystal material is preferably from 40 to 70° C. In addition, the LCD device of the fifth embodiment is suitable for use in the IPS LCD device.

According to the LCD device of the fifth embodiment, the LCD device is a fully integrated structure. The structure of this embodiment greatly reduces light leakage caused by gaps, thereby enhancing light utilization efficiency. In addition, the liquid crystal device and the OLED element use the same substrate (the first substrate 300), thus device weight and thickness can be reduced. Moreover, since the OLED element in the invention can be a multi-color display, the LCD device of the present invention does not require color filter(s), thereby enhancing light utilization efficiency and ameliorating the disadvantages of the prior art.

Finally, while the invention has been described by way of example and in terms of the above, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A liquid crystal display device, comprising:
   a first substrate;
   an organic electroluminescent display (OLED) element serving as a backlight source formed on the first substrate;
   a transparent protective layer formed on the OLED element;
   a common electrode formed on the transparent protective layer,
   a second substrate opposing the first substrate, wherein the second substrate has a pixel electrode thereon; and
   a liquid crystal layer responding to a voltage between the pixel and common electrodes interposed between the first substrate and the second substrate.

2. The liquid crystal display device according to claim 1, wherein the OLED element comprises:
   a cathode formed on the first substrate;
   an organic emitting layer formed on the cathode; and
   an anode formed on the organic emitting layer.

3. The liquid crystal display device according to claim 2, wherein the cathode is a metal layer.

4. The liquid crystal display device according to claim 2, wherein the anode is transparent.

5. The liquid crystal display device according to claim 1, wherein the transparent protective layer is a silicon nitride ($SiN_x$) layer.

6. The liquid crystal display device according to claim 1, wherein the transparent protective layer is a moisture blocking layer.

7. The liquid crystal display device according to claim 1, wherein the common electrode is an ITO (indium tin oxide) or IZO (indium zinc oxide) layer.

8. A liquid crystal display device, comprising:
   a first substrate;
   an organic electroluminescent display (OLED) element formed on the first substrate;
   a transparent protective layer formed on the OLED element;
   a common electrode formed on the transparent protective layer;
   a first polarizer formed on the common electrode;
   a second substrate opposing the first substrate;
   a pixel electrode formed on an inner side of the second substrate;
   a second polarizer formed on an outer side of the second substrate; and
   a liquid crystal responding to a voltage between the pixel and common electrodes layer interposed between the first substrate and the second substrate.

9. The liquid crystal display device according to claim 8, wherein the first polarizer is a wire grid polarizer or a thin film polarizer.

10. The liquid crystal display device according to claim 8, further comprising:
    a first alignment film formed on the first polarizer; and
    a second alignment film formed on the pixel electrode.

11. The liquid crystal display device according to claim 8, wherein the OLED element comprises:
    a cathode formed on the first substrate;
    an organic emitting layer formed on the cathode; and
    an anode formed on the organic emitting layer.

12. The liquid crystal display device according to claim 11, wherein the cathode is a metal layer.

13. The liquid crystal display device according to claim 11, wherein the anode is transparent.

14. The liquid crystal display device according to claim 8, wherein the transparent protective layer is a silicon nitride (SiNx) layer.

15. The liquid crystal display device according to claim 8, wherein the transparent protective layer is a moisture blocking layer.

16. The liquid crystal display device according to claim 8, wherein the common electrode is an ITO (indium tin oxide) or IZO (indium zinc oxide) layer.

17. The liquid crystal display device according to claim 9, wherein when the first polarizer is the wire grid polarizer, the wire grid polarizer comprises:
    a transparent layer formed on the common electrode; and
    a metal strip pattern formed on the transparent layer.

18. The liquid crystal display device according to claim 9, wherein when the first polarizer is the thin film polarizer, the thin film polarizer is an E-type polarizer.

19. The liquid crystal display device according to claim 8, wherein the common electrode is an ITO (indium tin oxide) or IZO (indium zinc oxide) layer.

20. The liquid crystal display device according to claim 11, wherein when the first polarizer is the wire grid polarizer, the liquid crystal display device further comprises:
    a reflective layer formed on the first substrate; and
    a retardation film formed on the reflective layer;
    wherein the cathode is semitransparent.

21. A liquid crystal display device, comprising:
    a first substrate;
    an organic electroluminescent display (OLED) element formed on the first substrate;
    a transparent protective layer formed on the OLED element;
    a first polarizer formed on the transparent protective layer, wherein the first polarizer is a wire grid polarizer;
    a second substrate opposing the first substrate;
    a pixel electrode formed on an inner side of the second substrate;
    a second polarizer formed on an outer side of the second substrate; and
    a liquid crystal responding to a voltage between the pixel and common electrodes layer interposed between the first substrate and the second substrate.

22. The liquid crystal display device according to claim 21, wherein the wire grid polarizer serves as a common electrode.

23. The liquid crystal display device according to claim 21, further comprising:
    a first alignment film formed on the first polarizer; and
    a second alignment film formed on the pixel electrode.

24. The liquid crystal display device according to claim 21, wherein the OLED element comprises:
    a cathode formed on the first substrate;
    an organic emitting layer formed on the cathode; and
    an anode formed on the organic emitting layer.

25. The liquid crystal display device according to claim 24, further comprising:
    a reflective layer formed on the first substrate; and
    a retardation film formed on the reflective layer;
    wherein the cathode is semitransparent.

26. The liquid crystal display device according to claim 25, wherein the cathode is a metal layer.

27. The liquid crystal display device according to claim 25, wherein the anode is transparent.

28. The liquid crystal display device according to claim 21, wherein the transparent protective layer is a silicon nitride ($SiN_x$) layer.

29. The liquid crystal display device according to claim 21, wherein the transparent protective layer is a moisture blocking layer.

30. The liquid crystal display device according to claim 21, wherein the wire grid polarizer comprises:
   a transparent layer formed on the common electrode; and
   a metal strip pattern formed on the transparent layer.

31. The liquid crystal display device according to claim 21, wherein the common electrode is an ITO (indium tin oxide) or IZO (indium zinc oxide) layer.

32. A liquid crystal display device suitable for an IPS (In-Plane Switching) mode liquid crystal display device, comprising:
   a first substrate;
   an organic electroluminescent display (OLED) element formed on the first substrate;
   a transparent protective layer formed on the OLED element;
   a first polarizer formed on the transparent protective layer;
   a second substrate opposing the first substrate;
   an electrode pattern formed on an inner side of the second substrate, wherein the electrode pattern provides an electric field parallel to the first and second substrates;
   a second polarizer formed on an outer side of the second substrate; and a liquid crystal layer interposed between and bounded by the first substrate and the second substrate.

33. The liquid crystal display device according to claim 32, wherein the first polarizer is a thin film polarizer.

34. The liquid crystal display device according to claim 32, further comprising:
   a first alignment film formed on the first polarizer; and
   a second alignment film formed on the electrode pattern.

35. The liquid crystal display device according to claim 32, wherein the OLED element comprises:
   a cathode formed on the first substrate;
   an organic emitting layer formed on the cathode; and
   an anode formed on the organic emitting layer.

36. The liquid crystal display device according to claim 35, wherein the cathode is a metal layer.

37. The liquid crystal display device according to claim 35, wherein the anode is transparent.

38. The liquid crystal display device according to claim 32, wherein the transparent protective layer is a silicon nitride ($SiN_x$) layer.

39. The liquid crystal display device according to claim 32, wherein the transparent protective layer is a moisture blocking layer.

40. The liquid crystal display device according to claim 33, wherein the thin film polarizer is an E-type polarizer.

* * * * *